US011014411B2

(12) United States Patent
Kubo (10) Patent No.: US 11,014,411 B2
(45) Date of Patent: May 25, 2021

(54) PNEUMATIC TIRE

(71) Applicant: Toyo Tire Corporation, Itami (JP)

(72) Inventor: Naoya Kubo, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 154 days.

(21) Appl. No.: 16/424,910

(22) Filed: May 29, 2019

(65) Prior Publication Data

US 2019/0375244 A1 Dec. 12, 2019

(30) Foreign Application Priority Data

Jun. 6, 2018 (JP) .............................. JP2018-108545

(51) Int. Cl.
*B60C 11/03* (2006.01)
*B60C 11/12* (2006.01)

(52) U.S. Cl.
CPC ...... *B60C 11/0304* (2013.01); *B60C 11/1204* (2013.01); *B60C 11/1236* (2013.01); *B60C 11/1259* (2013.01); *B60C 11/1281* (2013.01); B60C 2011/0348 (2013.01)

(58) Field of Classification Search
CPC . B60C 11/01; B60C 11/1281; B60C 11/0304; B60C 2011/0341
See application file for complete search history.

(56) References Cited

U.S. PATENT DOCUMENTS

| 2013/0248068 | A1 | 9/2013 | Nakata |
| 2016/0272011 | A1 | 9/2016 | Onabe et al. |
| 2017/0106703 | A1* | 4/2017 | Kubo .................. B60C 11/1236 |
| 2017/0190221 | A1* | 7/2017 | Kato ....................... B60C 11/04 |
| 2019/0001753 | A1* | 1/2019 | Hayashi ................. B60C 11/04 |
| 2020/0376895 | A1* | 12/2020 | Hamanaka ............ B60C 11/124 |

FOREIGN PATENT DOCUMENTS

| CN | 105916706 A | 8/2016 | |
| JP | 2010254049 A * | 11/2010 | ......... B60C 11/0304 |
| WO | 2012/098895 A1 | 7/2012 | |
| WO | 2017/122433 A1 | 7/2017 | |

OTHER PUBLICATIONS

Office Action dated Feb. 3, 2021, issued in counterpart CN Application No. 201910428019.9, with English translation. (14 pages).

* cited by examiner

*Primary Examiner* — Steven D Maki
*Assistant Examiner* — Cedrick S Williams
(74) *Attorney, Agent, or Firm* — Westerman, Hattori, Daniels & Adrian, LLP (57) ABSTRACT

A pneumatic tire comprises a plurality of main grooves extending in a tire circumferential direction, and a plurality of land portions that are partitioned by at least one contact patch end and the plurality of main grooves, at least one of the plurality of land portions comprises a circumferentially oriented sipe extending in a tire circumferential direction, and a plurality of width-oriented sipes extending in such fashion as to intersect the circumferentially oriented sipe, and wherein depth of the circumferentially oriented sipe is less than depths of the plurality of width-oriented sipes.

20 Claims, 4 Drawing Sheets

PNEUMATIC TIRE

CROSS REFERENCE TO RELATED APPLICATIONS

This application claims the benefit of priority of Japanese application no. 2018-108545, filed on Jun. 6, 2018, which is incorporated herein by reference.

BACKGROUND OF THE INVENTION

Field of the Invention

The present invention relates to a pneumatic tire.

Description of the Related Art

Conventionally, a pneumatic tire land portion might, for example, comprise land grooves extending along the tire circumferential direction, and a plurality of sipes which extend in such fashion as to intersect the land grooves (e.g., WO2012/098895A). This will make it possible to suppress occurrence of a situation in which rigidity at land portions becomes too high. However, where rigidity at land portions becomes too low, there will be a tendency for uneven wear to occur.

SUMMARY OF THE INVENTION

The problem is therefore to provide a pneumatic tire that makes it possible to suppress occurrence of wear that is uneven in the tire circumferential direction relative to boundaries in the form of width-oriented sipes.

There is provided a pneumatic tire comprises:

a plurality of main grooves extending in a tire circumferential direction; and a plurality of land portions that are partitioned by at least one contact patch end and the plurality of main grooves;

wherein at least one of the plurality of land portions comprises a circumferentially oriented sipe extending in a tire circumferential direction, and a plurality of width-oriented sipes extending in such fashion as to intersect the circumferentially oriented sipe; and wherein depth of the circumferentially oriented sipe is less than depths of the plurality of width-oriented sipes.

Further, the pneumatic tire may have a configuration in which:

at least one of the width-oriented sipes comprises a sipe portion at which width is constant, and a notch portion at which width increases toward the exterior in a tire radial direction;

the sipe portion is contiguous with at least one of the main grooves in such fashion as to be inclined with respect to the at least one main groove; and the notch portion is arranged at a corner at which the sipe portion intersects the at least one main groove to form an acute angle therebetween.

Further, the pneumatic tire may have a configuration in which:

at least one of the width-oriented sipes comprises a sipe portion at which width is constant, and a notch portion at which width increases toward the exterior in a tire radial direction;

the notch portion is contiguous with at least one of the main grooves; and width at a tread surface of the notch portion increases toward the at least one main groove.

Further, the pneumatic tire may have a configuration in which:

at least one of the width-oriented sipes comprises a sipe portion at which width is constant, and a notch portion at which width increases toward the exterior in a tire radial direction;

the notch portion is contiguous with at least one of the main grooves; and depth of the notch portion increases toward the at least one main grooves.

Further, the pneumatic tire may have a configuration in which:

at least one of the width-oriented sipes comprises a sipe portion at which width is constant, and a notch portion at which width increases toward the exterior in a tire radial direction; and the notch portion is contiguous with at least one of the main grooves; and void volume attributable to the notch portion increases toward the at least one main grooves.

Further, the pneumatic tire may have a configuration in which:

the at least one land portion is arranged outwardmost in a tire width direction among the plurality of land portions;

the notch portion comprises an inclined face which is inclined relative to a tread surface; and an angle at which the inclined face intersects the tread surface increases toward the exterior in the tire width direction.

Further, the pneumatic tire may have a configuration in which:

the at least one land portion is a land portion for which a dimension in a tire width direction is largest among the plurality of land portions.

Further, the pneumatic tire may have a configuration in which:

the circumferentially oriented sipe comprises a sipe portion at which width is constant, and a notch portion at which width increases toward the exterior in a tire radial direction.

Further, the pneumatic tire may have a configuration in which:

at least one of the width-oriented sipes intersects the circumferentially oriented sipe at a location partway in a tire width direction.

DETAILED DESCRIPTION OF THE INVENTION

Below, an embodiment of a pneumatic tire is described with reference to FIG. 1 through FIG. 5. At the respective drawings, note that dimensional ratios at the drawings and actual dimensional ratios are not necessarily consistent, and note further that dimensional ratios are not necessarily consistent from drawing to drawing.

At the respective drawings, first direction D1 is the tire width direction D1 which is parallel to the tire rotational axis which is the center of rotation of pneumatic tire (hereinafter also referred to as simply "tire") 1, second direction D2 is the tire radial direction D2 which is the direction of the diameter of tire 1, and third direction D3 is the tire circumferential direction D3 which is circumferential with respect to the rotational axis of the tire.

Note that the tire width direction D1 may be further subdivided into first side D11, which is also referred to as first width direction side D11; and second side D12, which is also referred to as second width direction side D12. Furthermore that the tire circumferential direction D3 may be further subdivided into first side D31, which is also referred to as first circumferential direction side D31; and second side D32, which is also referred to as second circumferential direction side D32.

Tire equatorial plane S1 refers to a plane that is located centrally in the tire width direction D1 of tire 1 and that is perpendicular to the rotational axis of the tire; tire meridional planes refer to planes that are perpendicular to tire equatorial plane S1 and that contain the rotational axis of the tire. Furthermore, the tire equator is the curve formed by the intersection of tire equatorial plane S1 and the outer surface (tread surface 2a, described below) in the tire radial direction D2 of tire 1.

Figure 1:
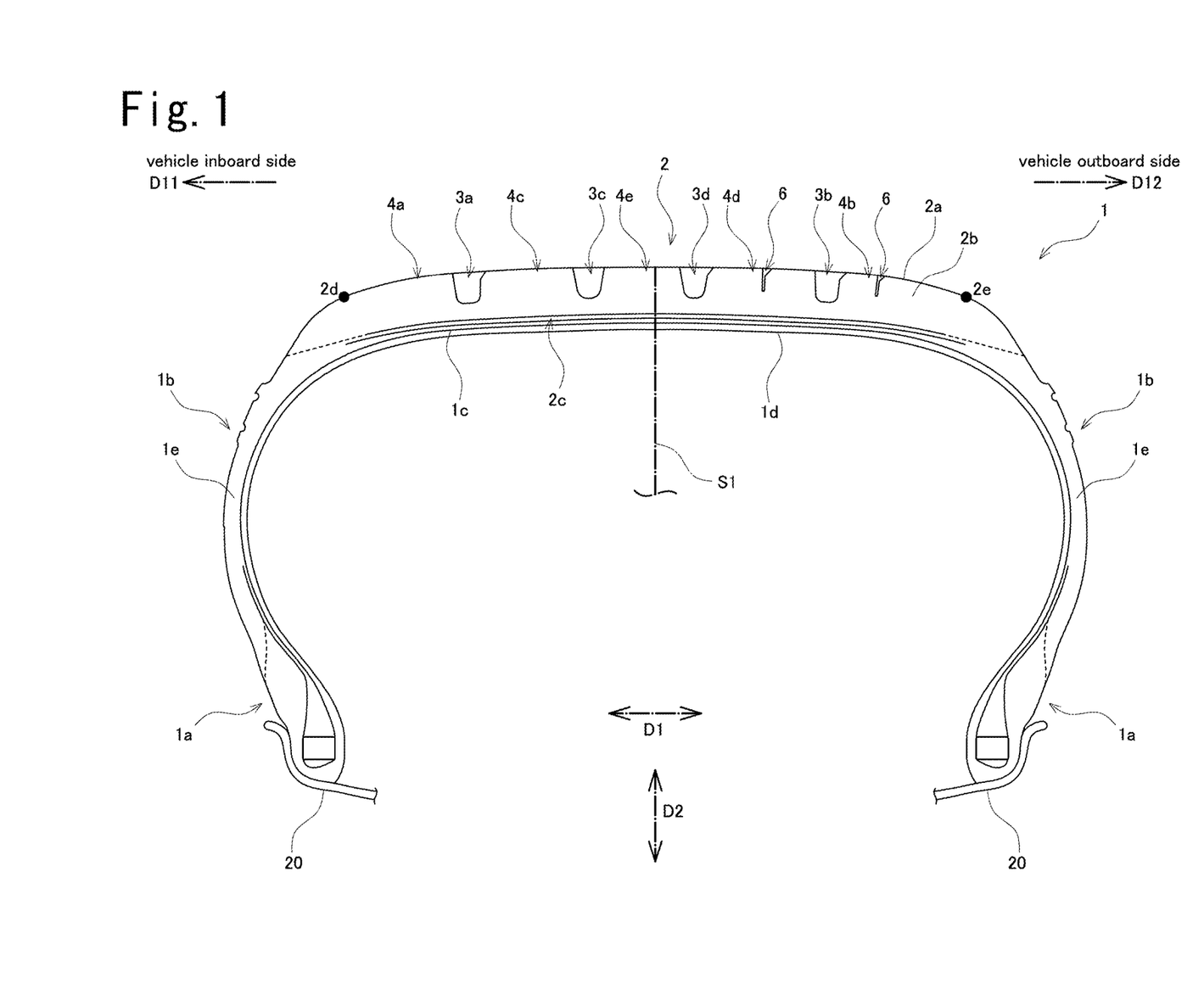
FIG. 1 is a view of a section, taken along a tire meridional plane, of the principal components in a pneumatic tire associated with an embodiment.

As shown in FIG. 1, tire 1 associated with the present embodiment is provided with a pair of bead regions 1a at which beads are present; sidewall regions 1b which extend outwardly in the tire radial direction D2 from the respective bead regions 1a; and tread region 2, the exterior surface in the tire radial direction D2 of which contacts the road surface and which is contiguous with the outer ends in the tire radial direction D2 of the pair of sidewall regions 1b. In accordance with the present embodiment, tire 1 is a pneumatic tire 1, the interior of which is capable of being filled with air, and which is capable of being mounted on a rim 20.

Furthermore, tire 1 is provided with carcass layer 1c which spans the pair of beads, and innerliner layer 1d which is arranged at a location toward the interior from carcass layer 1c and which has superior functionality in terms of its ability to impede passage of gas therethrough so as to permit air pressure to be maintained. Carcass layer 1c and innerliner layer 1d are arranged in parallel fashion with respect to the inner circumferential surface of the tire over a portion thereof that encompasses bead regions 1a, sidewall regions 1b, and tread region 2.

Tire 1 has a structure that is asymmetric with respect to tire equatorial plane S1. In accordance with the present embodiment, tire 1 is a tire for which a vehicle mounting direction is indicated, which is to say that there is an indication of whether the left or the right side of the tire 1 should be made to face the vehicle when tire 1 mounted on rim 20. Moreover, the tread pattern formed at the tread surface 2a at tread region 2 is asymmetric with respect to tire equatorial plane S1.

The orientation in which the tire is to be mounted on the vehicle is indicated at sidewall region 1b. More specifically, sidewall region 1b is provided with sidewall rubber 1e which is arranged toward the exterior in the tire width direction D1 from carcass layer 1c so as to constitute the tire exterior surface, said sidewall rubber 1e have an indicator region that indicates a vehicle mounting direction.

For example, one sidewall region 1b, i.e., that which is to be arranged toward the inboard side (hereinafter also referred to as "vehicle inboard side") of the mounted tire, is marked (e.g., with the word "INSIDE" or the like) so as to contain an indication to the effect that it is for the vehicle inboard side. While for example, the other sidewall region 1b, i.e., that which is to be arranged toward the outboard side (hereinafter also referred to as "vehicle outboard side") of the mounted tire, is marked (e.g., with the word "OUTSIDE" or the like) so as to contain an indication to the effect that it is for the vehicle outboard side. In accordance with the present embodiment, first width direction side D11 is taken to be the vehicle inboard side, and second width direction side D12 is taken to be the vehicle outboard side.

Tread region 2 is provided with tread rubber 2b having tread surface 2a which contacts the road surface, and belt layer 2c which is arranged between tread rubber 2b and carcass layer 1c. Present at tread surface 2a is the contact patch that actually comes in contact with the road surface, and the portions within said contact patch that are present at the outer ends in the tire width direction D1 are referred to as contact patch ends 2d, 2e. Note that said contact patch refers to the portion of the tread surface 2a that comes in contact with the road surface when a normal load is applied to a tire 1 mounted on a normal rim 20 when the tire 1 is inflated to normal internal pressure and is placed in vertical orientation on a flat road surface.

Normal rim 20 is that particular rim 20 which is specified for use with a particular tire 1 in the context of the body of standards that contains the standard that applies to the tire 1 in question, this being referred to, for example, as a standard rim in the case of JATMA, a "Design Rim" in the case of IRA, or a "Measuring rim" in the case of ETRTO.

Normal internal pressure is that air pressure which is specified for use with a particular tire 1 in the context of the body of standards that contains the standard that applies to the tire 1 in question, this being maximum air pressure in the case of JATMA, the maximum value listed at the table entitled "TIRE LOAD LIMITS AT VARIOUS COLD INFLATION PRESSURES" in the case of TRA, or "INFLATION PRESSURE" in the case of ETRTO, which when tire 1 is to used on a passenger vehicle is taken to be an internal pressure of 180 KPa.

Normal load is that load which is specified for use with a particular tire 1 in the context of the body of standards that contains the standard that applies to the tire 1 in question, this being maximum load capacity in the case of JATMA, the maximum value listed at the aforementioned table in the case of TRA, or "LOAD CAPACITY" in the case of ETRTO, which when tire 1 is to be used on a passenger vehicle is taken to be 85% of the load corresponding to an internal pressure of 180 KPa.

Figure 2:
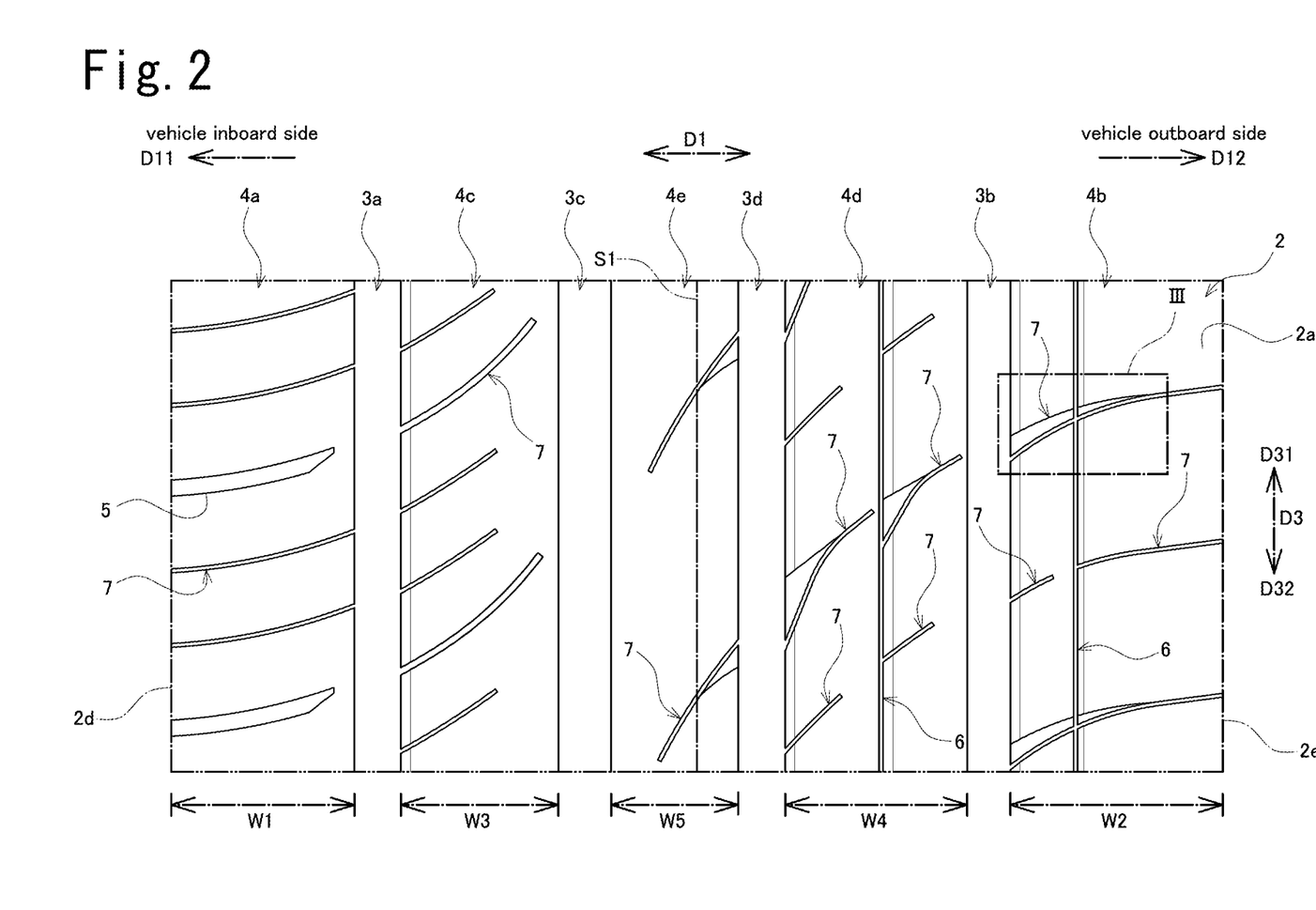
FIG. 2 is a drawing showing a tread surface of the principal components in a pneumatic tire associated with same embodiment as they would exist if unwrapped so as to lie in a single plane.

As shown in FIG. 1 and FIG. 2, tread rubber 2b is provided with a plurality of main grooves 3a through 3d extending in the tire circumferential direction D3. Main groove 3a through 3d extends continuously in the tire circumferential direction D3. Note that whereas main grooves 3a through 3d extend in straight fashion in the tire circumferential direction D3 in the present embodiment, there is no limitation with respect to such constitution, it also being possible to adopt a constitution in which these are, for example, repeatedly bent such that they extend in zigzag fashion, or a constitution in which these are, for example, repeatedly curved such that they extend in wavy fashion.

Main groove 3a through 3d might, for example, be provided with so-called tread wear indicator(s) (not shown) which are portions at which depth of the groove is reduced so as to make it possible to ascertain the extent to which wear has occurred as a result of the exposure thereof that takes place in accompaniment to wear. Furthermore, main groove 3a through 3d might, for example, have a width that is not less than 3% of the distance (dimension in the tire width direction D1) between contact patch ends 2d, 2e. Furthermore, main groove 3a through 3d might, for example, have a width that is not less than 5 mm.

Furthermore, the pair of main grooves 3a, 3b arranged at outermost locations in the tire width direction D1 are referred to as shoulder main grooves 3a, 3b, and the main grooves 3c, 3d arranged between the pair of shoulder main grooves 3a, 3b are referred to as center main grooves 3c, 3d. There is no particular limitation with respect to the number of main grooves 3a through 3d, and in accordance with the present embodiment, the number of main grooves 3a through 3d that are present is four.

Tread rubber 2b is provided with a plurality of land portions 4a through 4e which are partitioned by a plurality of main grooves 3a through 3d and the pair of contact patch ends 2d, 2e. There is no particular limitation with respect to the number of land portions 4a through 4e, and in accordance with the present embodiment, the number of land portions 4a through 4e that are present is five.

The land portions 4a, 4b which are partitioned by shoulder main groove 3a, 3b and contact patch end 2d, 2e are referred to as shoulder land portions 4a, 4b, and land portions 4c through 4e which are partitioned by the pair of main grooves 3a through 3d adjacent thereto are referred to as middle land portions 4c through 4e. Note, land portions 4c, 4d which are partitioned by shoulder main groove 3a, 3b and center main groove 3c, 3d are referred to as quarter land portions (also referred to as "mediate land portions") 4c, 4d, and land portion 4e which is partitioned by the pair of center main grooves 3c, 3d is referred to as center land portion 4e.

Dimension W2 in the tire width direction D1 of shoulder land portion 4b at the outboard side D12 is the largest among dimensions W1 through W5 in the tire width direction D1 of all of the land portions 4a through 4e. That is, shoulder land portion 4b at outboard side D12 is the land portion 4b for which the dimension W2 in the tire width direction D1 is greatest. Note that center land portion 4e is arranged in such fashion as to contain tire equatorial plane S1.

Land portions 4a through 4e comprise land groove (s) 5 of width greater than 2.0 mm, and sipes 6, 7 of width (the widths of what are referred to below as "sipe portions 6a, 7a") not greater than 2.0 mm. Sipes 6, 7 comprise circumferentially oriented sipe(s) 6 extending in the tire circumferential direction D3, and width-oriented sipe(s) 7 extending in such fashion as to intersect the tire circumferential direction D3.

In accordance with the present embodiment, land grooves 5 are provided at shoulder land portion 4a at inboard side D11, circumferentially oriented sipes 6 are provided at quarter land portion 4d and shoulder land portion 4b at outboard side D12, and width-oriented sipes 7 are provided at all land portions 4a through 4e. Note that land portions 4a through 4e which are provided with land grooves 5 and sipes 6, 7 are not limited to such constitution.

Figure 3:
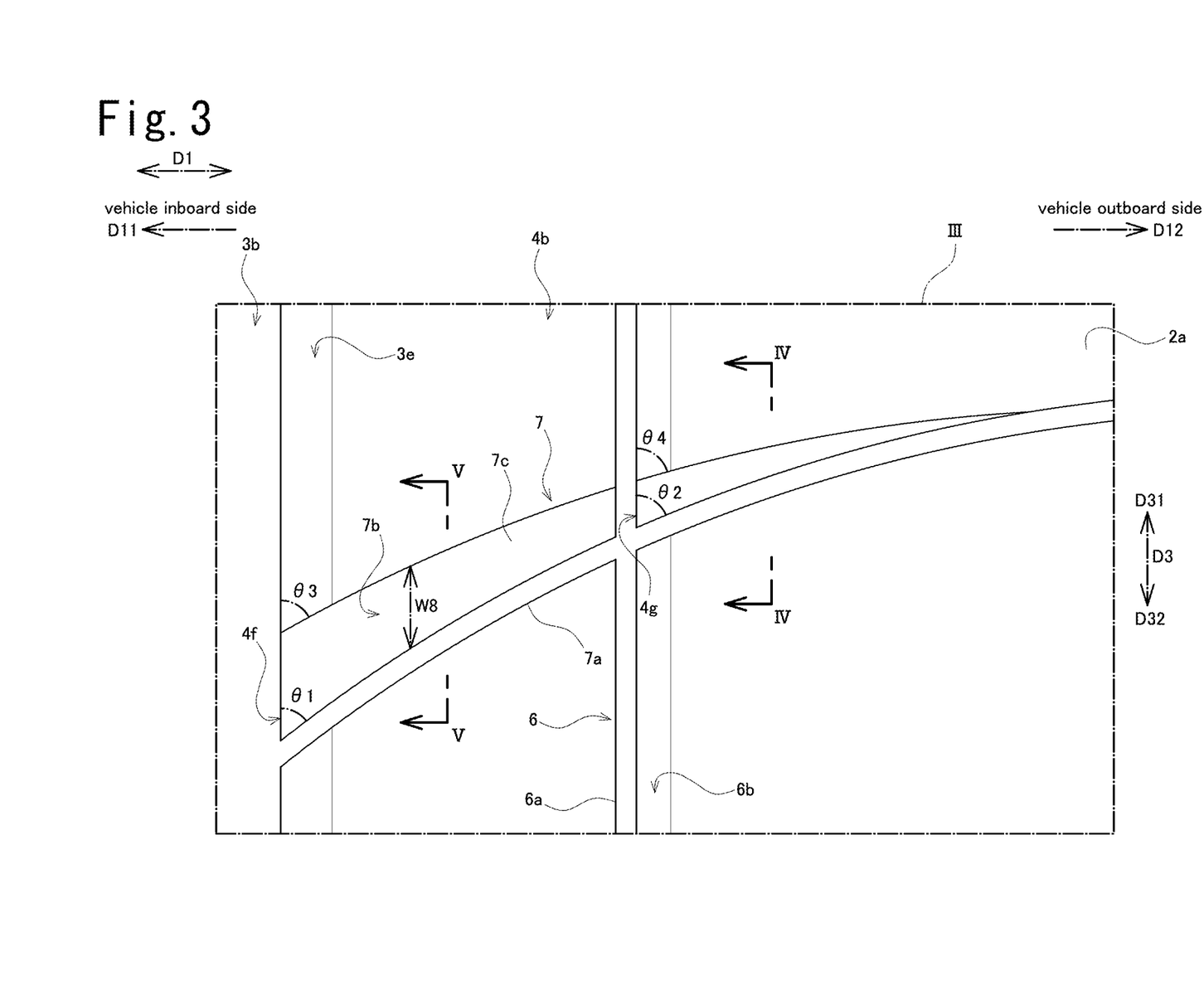
FIG. 3 is an enlarged view of region III in FIG. 2.

The constitution of shoulder land portion (hereinafter also referred to as "outboard shoulder land portion") 4b at outboard side D12 will now be described with reference to FIG. 3 through FIG. 5.

The first thing that should be mentioned is that outboard shoulder land portion 4b is the land portion 4b for which the dimension W2 in the tire width direction D1 is greatest. This causes the rigidity of outboard shoulder land portion 4b to be high. As shown in FIG. 3, width-oriented sipe 7 therefore extends in such fashion as to intersect circumferentially oriented sipe 6. This makes it possible to suppress occurrence of a situation in which rigidity of outboard shoulder land portion 4b becomes too high. Accordingly, it will be possible to increase the contact patch length at outboard shoulder land portion 4b, which is to say that it will be possible to increase the contact patch area at outboard shoulder land portion 4b.

However, if depths W6, W7 of circumferentially oriented sipe(s) 6 and width-oriented sipe(s) 7 are too large, it is sometimes that case that the rigidity of outboard shoulder land portion 4b will be too low. Depth W6 of circumferentially oriented sipe 6 is therefore less than depth W7 of width-oriented sipe 7 (see FIG. 4). This makes it possible to suppress occurrence of a situation in which rigidity of outboard shoulder land portion 4b becomes too low.

And what is more, because allowance has been made to ensure that there is adequate depth W7 at width-oriented sipe 7, the leading edge side and the trailing edge side of width-oriented sipe 7 respectively make contact with the road surface in such fashion that there is uniform contact patch pressure thereat. This makes it possible to suppress occurrence of wear (so-called "heel-and-toe wear") that is uneven in the tire circumferential direction D3 relative to boundaries in the form of width-oriented sipes 7. Moreover, while there is no particular limitation with respect to the ratio of the depth W6 of circumferentially oriented sipe 6 to the depth W7 of width-oriented sipe 7, it is, for example, preferred that this be 75% to 95%, and more preferred that this be 80% to 90%.

Width-oriented sipe 7 intersects circumferentially oriented sipe 6 at a location partway in the tire width direction D1. Furthermore, width-oriented sipe 7 comprises sipe portion 7a at which width is constant, and notch portion 7b at which width increases toward the exterior in the tire radial direction D2. Moreover, circumferentially oriented sipe 6 likewise comprises sipe portion 6a at which width is constant, and notch portion 6b at which width increases toward the exterior in the tire radial direction D2; and shoulder main groove 3b likewise comprises notch portion 3e at which width increases toward the exterior in the tire radial direction D2.

In addition, sipe portion 7a of width-oriented sipe 7 is contiguous with shoulder main groove 3a in such fashion as to be inclined with respect to shoulder main groove 3b. This being the case, outboard shoulder land portion 4b comprises first corner 4f at which sipe portion 7a of width-oriented sipe 7 intersects shoulder main groove 3b to form an acute angle θ1 therebetween, and second corner 4g at which sipe portion 7a of width-oriented sipe 7 intersects circumferentially oriented sipe 6 to form an acute angle θ2 therebetween.

It so happens that rigidity of corners 4f, 4g which are acute angles is low. This being the case, during contact with the ground, because there is a tendency for slippage and so forth to occur at corners 4f, 4g, there is a tendency for corners 4f, 4g to wear. Notch portion 7b of width-oriented sipe 7 is therefore arranged at first and second corners 4f, 4g. More specifically, notch portion 7b of width-oriented sipe 7 extends in parallel fashion with respect to the edge toward first circumferential direction side D31 of sipe portion 7a, being arranged thereat throughout the regions corresponding to first and second corners 4f, 4g.

This being the case, during contact with the ground, because this will make it possible to suppress occurrence of slippage and so forth at first and second corners 4f, 4g, this will make it possible to suppress occurrence of too much wear at first and second corners 4f, 4g. Accordingly, it will be possible to suppress occurrence of heel-and-toe wear relative to boundaries in the form of width-oriented sipes 7 at the locations of first and second corners 4f, 4g.

What is more, width W8 at tread surface 2a of notch portion 7b of width-oriented sipe 7 increases toward shoulder main groove 3b. This being the case, angle θ3 at which the edge of notch portion 7b intersects shoulder main groove 3b is greater than acute angle θ1 of first corner 4f. Accordingly, because it will be possible to suppress lowering of rigidity at portions where width-oriented sipes 7 are contiguous with shoulder main groove 3b, it will be possible to suppress occurrence of heel-and-toe wear relative to boundaries in the form of width-oriented sipes 7.

Similarly, angle θ4 at which the edge of notch portion 7b intersects circumferentially oriented sipe 6 is greater than acute angle θ2 of second corner 4g. Accordingly, because it will be possible to suppress lowering of rigidity at portions where width-oriented sipes 7 intersect circumferentially oriented sipes 6, it will be possible to suppress occurrence of heel-and-toe wear relative to boundaries in the form of width-oriented sipes 7.

Figure 4:
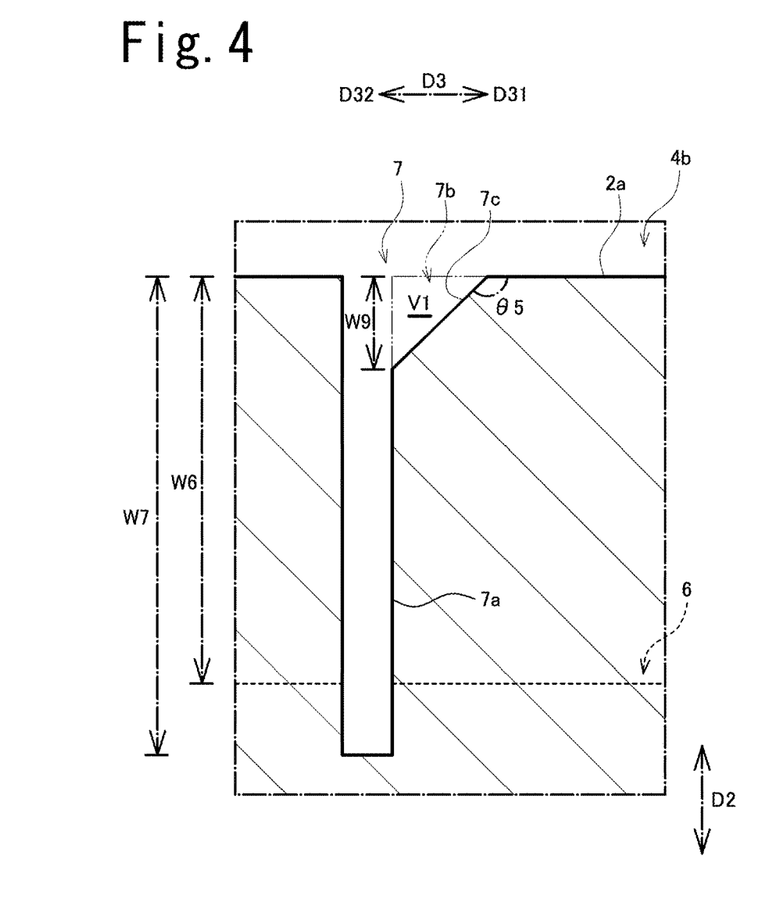
FIG. 4 is an enlarged view of a section taken along IV-IV in FIG. 3.
Figure 5:
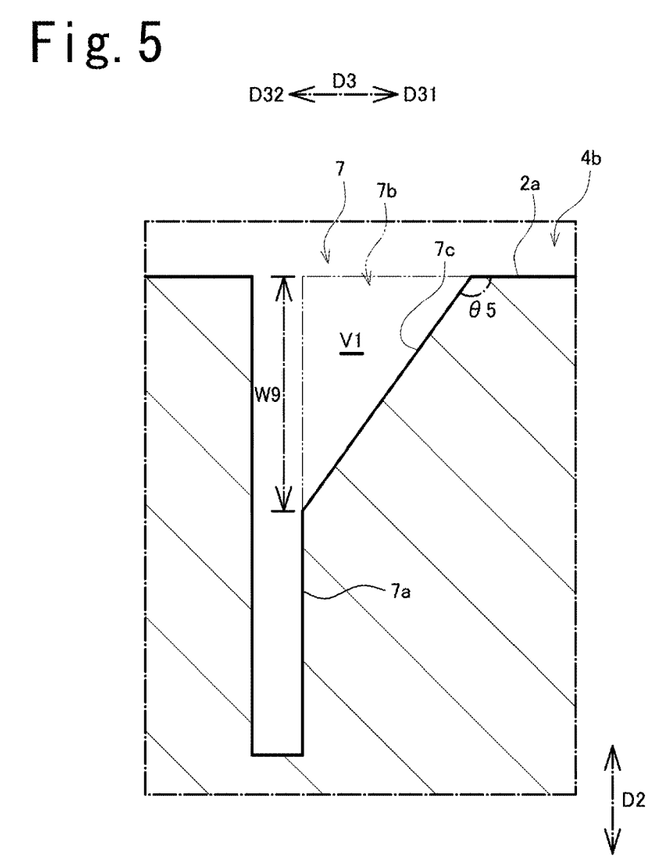
FIG. 5 is an enlarged view of a section taken along V-V in FIG. 3.

Furthermore, as shown in FIG. 4 and FIG. 5, depth W9 of notch portion 7b of width-oriented sipe 7 increases toward shoulder main groove 3b. In addition, void volume V1 attributable to notch portion 7b of width-oriented sipe 7 increases toward shoulder main groove 3b. This being the case, water at the interior of notch portion 7b will tend to flow toward shoulder main groove 3b. Accordingly, because it will be possible to cause water shedding from notch portion 7b toward shoulder main groove 3b to be carried out in an efficient manner, this will make it possible to improve water shedding performance.

Note that depth W9 of notch portion 7b may increase in intermittent and/or continuous fashion toward shoulder main groove 3b. Similarly, void volume V1 attributable to notch portion 7b may increase in intermittent and/or continuous fashion toward shoulder main groove 3b.

Furthermore, notch portion 7b comprises inclined face 7c which is inclined relative to tread surface 2a. In addition, angle (the angle on the side at which rubber is present; i.e., on the side at which there is an obtuse angle) θ5 at which inclined face 7c intersects tread surface 2a increases toward the exterior in the tire width direction D1, i.e., toward outboard side D12. This being the case, rigidity of shoulder land portion 4b will increase toward the exterior in the tire width direction D1, i.e., toward outboard side D12. Accordingly, it will be possible to improve stability in handling during turns.

Note that angle θ5 at which inclined face 7c intersects tread surface 2a may increase in intermittent and/or continuous fashion toward the exterior in the tire width direction D1. In accordance with the present embodiment, said angle θ5 is constant (e.g., 127° to 137°) at inclined face(s) 7c to the outboard side D12 of circumferentially oriented sipe(s) 6, and is constant (e.g., 117° to 127°) at inclined face(s) 7c to the inboard side D11 of circumferentially oriented sipe(s) 6.

Furthermore, although not described in detail, as shown in FIG. 1, quarter land portion 4d at outboard side D12 comprises circumferentially oriented sipe 6 extending in the tire circumferential direction D3, and a plurality of width-oriented sipes 7 extending in such fashion as to intersect the circumferentially oriented sipe 6. In addition, at quarter land portion 4d at outboard side D12, depth W6 of circumferentially oriented sipe 6 is less than the depths W7 of the plurality of width-oriented sipes 7.

As described above, the pneumatic tire 1 of the embodiment includes: a plurality of main grooves 3a through 3d extending in a tire circumferential direction D3; and a plurality of land portions 4a through 4e that are partitioned by at least one contact patch end 2d, 2e and the plurality of main grooves 3a through 3d; wherein at least one 4b, 4d of the plurality of land portions 4a through 4e comprises a circumferentially oriented sipe 6 extending in a tire circumferential direction D3, and a plurality of width-oriented sipes 7 extending in such fashion as to intersect the circumferentially oriented sipe 6; and wherein depth W6 of the circumferentially oriented sipe 6 is less than depths W7 of the plurality of width-oriented sipes 7.

In accordance with such constitution, circumferentially oriented sipe 6 extends in the tire circumferential direction D3, and the plurality of width-oriented sipes 7 extend in such fashion as to intersect the circumferentially oriented sipe 6. This being the case, because it will be possible to suppress occurrence of a situation in which rigidity at land portions 4b, 4d becomes too high, it will be possible to increase the contact patch length at said land portions 4b, 4d, which is to say that it will be possible to increase the contact patch area at said land portions 4b, 4d.

Furthermore, because depth W6 of circumferentially oriented sipe 6 is less than the depths W7 of the plurality of width-oriented sipes 7, it will be possible to suppress occurrence of a situation in which rigidity at land portion 4b becomes too low. And what is more, because allowance has been made to ensure that there is adequate depth W7 at width-oriented sipes 7, it will be possible to suppress occurrence of wear that is uneven in the tire circumferential direction D3 relative to boundaries in the form of width-oriented sipes 7.

In the pneumatic tire 1 of the embodiment, at least one 7 of the width-oriented sipes 7 comprises a sipe portion 7a at which width is constant, and a notch portion 7b at which width increases toward the exterior in a tire radial direction D2; the sipe portion 7a is contiguous with at least one 3b of the main grooves 3a through 3d in such fashion as to be inclined with respect to the at least one main groove 3b; and the notch portion 7b is arranged at a corner 4f at which the sipe portion 7a intersects the at least one main groove 3b to form an acute angle therebetween.

In accordance with such constitution, notch portion 7b is arranged at corner 4f to address the tendency for corner 4f to wear due to slippage that might otherwise occur at corner 4f during contact with the ground. Because this makes it possible to suppress occurrence of slippage at corner 4f during contact with the ground, this makes it possible to suppress occurrence of too much wear at corner 4f.

In the pneumatic tire 1 of the embodiment, width W8 at a tread surface 2a of the notch portion 7b increases toward the at least one main groove 3b.

In accordance with such constitution, because width W8 at tread surface 2a of notch portion 7b increases toward main groove 3b, angle θ3 at which the edge of notch portion 7b intersects main groove 3b is greater than angle θ1 of corner 4f. This being the case, it will be possible to suppress lowering of rigidity at portions where width-oriented sipes 7 are contiguous with main groove 3b.

In the pneumatic tire 1 of the embodiment, void volume V1 attributable to the notch portion 7b increases toward the at least one main grooves 3b.

In accordance with such constitution, because void volume V1 attributable to notch portion 7b increases toward main groove 3b, water at the interior of notch portion 7b will tend to flow toward main groove 3b. This being the case, it will be possible to cause water shedding from notch portion 7b toward main groove 3b to be carried out in an efficient manner.

In the pneumatic tire 1 of the embodiment, the at least one land portion 4b is arranged outwardmost in a tire width direction D1 among the plurality of land portions 4a through 4e; the notch portion 7b comprises an inclined face 7c which is inclined relative to a tread surface 2a; and an angle θ5 at which the inclined face 7c intersects the tread surface 2a increases toward the exterior in the tire width direction D1.

In accordance with such constitution, angle θ5 at which inclined face 7c intersects tread surface 2a increases toward the exterior in the tire width direction D1. This being the case, rigidity of land portion 4b, which is arranged in outwardmost fashion in the tire width direction D1, will increase toward the exterior in the tire width direction D1.

In the pneumatic tire 1 of the embodiment, the at least one land portion 4b is a land portion 4b for which a dimension W2 in a tire width direction D1 is largest among the plurality of land portions 4a through 4e.

In accordance with such constitution, rigidity of land portion 4b, for which the dimension W2 in the tire width direction D1 is largest, will tend to increase. To address this, circumferentially oriented sipe 6 is made to extend in the tire circumferential direction D3, and the plurality of width-oriented sipes 7 are made to extend in such fashion as to intersect the circumferentially oriented sipe 6. This being the case, because it will be possible to suppress occurrence of a situation in which rigidity at land portion 4b becomes too high, it will be possible to increase the contact patch length at said land portion 4b, which is to say that it will be possible to increase the contact patch area at said land portion 4b.

The pneumatic tire 1 is not limited to the configuration of the embodiment described above, and the effects are not limited to those described above. It goes without saying that the pneumatic tire 1 can be variously modified without departing from the scope of the subject matter of the present invention. For example, the constituents, methods, and the like of various modified examples described below may be arbitrarily selected and employed as the constituents, methods, and the like of the embodiments described above, as a matter of course.

(1) The constitution of pneumatic tire 1 associated with the foregoing embodiment is such that two land portions (more specifically, all of the land portions that are entirely arranged to the outboard side D12 of tire equatorial plane S1) 4b, 4d each comprise a circumferentially oriented sipe 6, and a plurality of width-oriented sipes 7 which intersect the circumferentially oriented sipe 6 and which are deeper than the circumferentially oriented sipe 6. However, pneumatic tire 1 is not limited to such constitution. It is sufficient that the constitution be such that at least one of land portions 4a through 4e comprise a circumferentially oriented sipe 6, and a plurality of width-oriented sipes 7 which intersect the circumferentially oriented sipe 6 and which are deeper than the circumferentially oriented sipe 6.

(2) Furthermore, the constitution of pneumatic tire 1 associated with the foregoing embodiment is such that notch portion 7b of width-oriented sipe 7 is arranged at corner 4f at which sipe portion 7a intersects main groove 3b to form an acute angle θ1 therebetween. However, pneumatic tire 1 is not limited to such constitution. For example, it is also possible to adopt a constitution in which notch portion 7b of width-oriented sipe 7 is arranged at a corner at which sipe portion 7a intersects main groove 3b to form an obtuse angle therebetween. Furthermore, it is also possible, for example, to adopt a constitution in which width-oriented sipe 7 does not comprise notch portion 7b.

(3) Furthermore, the constitution of pneumatic tire 1 associated with the foregoing embodiment is such that width W8 at tread surface 2a of notch portion 7b of width-oriented sipe 7 increases toward main groove 3b. However, pneumatic tire 1 is not limited to such constitution. For example, it is also possible to adopt a constitution in which width W8 at tread surface 2a of notch portion 7b of width-oriented sipe 7 decreases, or a constitution in which it remains constant, toward main groove 3b.

(4) Furthermore, the constitution of pneumatic tire 1 associated with the foregoing embodiment is such that void volume V1 attributable to notch portion 7b of width-oriented sipe 7 increases toward main groove 3b. However, pneumatic tire 1 is not limited to such constitution. For example, it is also possible to adopt a constitution in which void volume V1 attributable to notch portion 7b of width-oriented sipe 7 decreases, or a constitution in which it remains constant, toward main groove 3b.

(5) Furthermore, the constitution of pneumatic tire 1 associated with the foregoing embodiment is such that angle θ5 at which inclined face 7c intersects tread surface 2a increases toward the exterior in the tire width direction D1. However, pneumatic tire 1 is not limited to such constitution. For example, it is also possible to adopt a constitution in which angle θ5 at which inclined face 7c intersects tread surface 2a decreases, or a constitution in which it remains constant, toward the exterior in the tire width direction D1.

(6) Furthermore, the constitution of pneumatic tire 1 associated with the foregoing embodiment is such that this is a tire for which a vehicle mounting direction is indicated. However, pneumatic tire 1 is not limited to such constitution. For example, it is also possible to adopt a constitution in which pneumatic tire 1 is a tire for which a vehicle mounting direction is not indicated. More specifically, the tread pattern may be a tread pattern that exhibits point symmetry about an arbitrary point on the tire equator, or may be a tread pattern that exhibits line symmetry about the tire equator.

The invention claimed is:
1. A pneumatic tire comprising:
   a plurality of main grooves extending in a tire circumferential direction;
   a plurality of land portions that are partitioned by at least one contact patch end and the plurality of main grooves; and
   at least one indicator region that indicates a vehicle mounting direction, wherein
      the plurality of main grooves include a shoulder main groove outwardmost on a vehicle outboard side of the tire when mounted on a vehicle,
      the plurality of land portions include an outboard shoulder land portion partitioned by the shoulder main groove and a contact patch end at the vehicle outboard side of the tire,
      the outboard shoulder land portion includes a circumferentially oriented sipe extending in a tire circumferential direction, and a plurality of first width-oriented sipes extending to intersect the circumferentially oriented sim,
      a depth of the circumferentially oriented sipe is less than depths of the plurality of first width-oriented sipes,
      at least one of the first width-oriented sipes includes a sipe portion at which width is constant, and a notch portion at which width increases outwardly in a tire radial direction,
      a first edge of the notch portion is contiguous with the sipe portion, a second edge of the notch portion is outwards from the first edge in the tire radial direction,
the sipe portion is contiguous with the shoulder main groove and inclined with respect to the shoulder main groove,
a first acute angle is formed at an intersection between the shoulder main groove and the sipe portion,
a second acute angle is formed at an intersection between the shoulder main groove and the second edge of the notch portion, and
the second acute angle is greater than the first acute angle.

2. The pneumatic tire according to claim 1 wherein
the notch portion includes an inclined face which is inclined relative to the tread surface, and
an angle at which the inclined face intersects the tread surface increases outwardly in a tire width direction.

3. The pneumatic tire according to claim 1 wherein the outboard shoulder land portion is a land portion for which a dimension in a tire width direction is largest among the plurality of land portions.

4. The pneumatic tire according to claim 1 wherein the at least one of the first width-oriented sipes intersects the circumferentially oriented sipe at a location partway in a tire width direction.

5. The pneumatic tire according to claim 1 wherein a ratio of a depth of the circumferentially oriented sipe to a depth of first width-oriented sipe is 75% to 95%.

6. The pneumatic tire according to claim 1 wherein
the circumferentially oriented sipe includes a circumferential sipe portion at which width is constant, and a circumferential notch portion at which width increases outwardly in the tire radial direction, and
the circumferential notch portion is on the vehicle outboard side of the circumferential sipe portion.

7. The pneumatic tire according to claim 6 wherein the shoulder main groove includes a groove notch portion at which width increases outwardly in the tire radial direction.

8. The pneumatic tire according to claim 1 wherein
the outboard shoulder land portion further comprises a plurality of second width-oriented sipes extending to intersect the tire circumferential direction,
the plurality of second width-oriented sipes are arranged to alternate with the plurality of first width-oriented sipes in the tire circumferential direction,
a first end in the tire width direction of each of the plurality of first width-oriented sipes is contiguous with the shoulder main groove,
a second end in the tire width direction of each of the plurality of first width-oriented sipes is contiguous with the contact patch end,
a first end in the tire width direction of each of the plurality of second width-oriented sipes is contiguous with the circumferentially oriented sipe, and
a second end in the tire width direction of each of the plurality of second width-oriented sipes is contiguous with the contact patch end.

9. The pneumatic tire according to claim 8 wherein
the outboard shoulder land portion further comprises a plurality of third width-oriented sipes extending to intersect the tire circumferential direction,
the plurality of third width-oriented sipes are arranged to alternate with the plurality of first width-oriented sipes in the tire circumferential direction,
a first end in the tire width direction of each of the plurality of third width-oriented sipes is contiguous with the shoulder main groove, and
a second end in the tire width direction of each of the plurality of third width-oriented sipes is between the shoulder main groove and the circumferentially oriented sipe.

10. The pneumatic tire according to claim 1 wherein
a first end in the tire width direction of the notch portion is contiguous with the shoulder main groove, and
a second end in the tire width direction of the notch portion is between the circumferentially oriented sipe and the contact patch end.

11. The pneumatic tire according to claim 10 wherein
a first end in the tire width direction of the sipe portion is contiguous with the shoulder main groove, and
a second end in the tire width direction of the sipe portion is contiguous with the contact patch end.

12. The pneumatic tire according to claim 11 wherein
a third acute angle is formed at an intersection between the circumferentially oriented sipe and the sipe portion on the vehicle outboard side of the circumferentially oriented sipe,
a fourth acute angle is formed at an intersection between the circumferentially oriented sipe and the second edge of the notch portion on the vehicle outboard side of the circumferentially oriented sipe, and
the fourth acute angle is greater than the third acute angle.

13. The pneumatic tire according to claim 12 wherein
the third acute angle is greater than the first acute angle, and
the fourth acute angle is greater than the second acute angle.

14. The pneumatic tire according to claim 12 wherein
the outboard shoulder land portion further comprises a plurality of second width-oriented sipes extending to intersect the tire circumferential direction,
the plurality of second width-oriented sipes are arranged to alternate with the plurality of first width-oriented sipes in the tire circumferential direction,
a first end in the tire width direction of each of the plurality of second width-oriented sipes is contiguous with the circumferentially oriented sipe, and
a second end in the tire width direction of each of the plurality of second width-oriented sipes is contiguous with the contact patch end.

15. The pneumatic tire according to claim 14 wherein
the outboard shoulder land portion further comprises a plurality of third width-oriented sipes extending to intersect the tire circumferential direction,
the plurality of third width-oriented sipes are arranged to alternate with the plurality of first width-oriented sipes in the tire circumferential direction,
a first end in the tire width direction of each of the plurality of third width-oriented sipes is contiguous with the shoulder main groove, and
a second end in the tire width direction of each of the plurality of third width-oriented sipes is between the shoulder main groove and the circumferentially oriented sipe.

16. The pneumatic tire according to claim 12 wherein
the circumferentially oriented sipe includes a circumferential sipe portion at which width is constant, and a circumferential notch portion at which width increases outwardly in a tire radial direction, and
the circumferential notch portion is arranged on the vehicle outboard side of the circumferential sipe portion.

17. The pneumatic tire according to claim 16 wherein the shoulder main groove includes a groove notch portion at which width increases outwardly in the tire radial direction.

18. The pneumatic tire according to claim 12 wherein a width at a tread surface of the notch portion increases toward the shoulder main groove.

19. The pneumatic tire according to claim 18 wherein a depth of the notch portion increases toward the shoulder main groove.

20. The pneumatic tire according to claim 19 wherein void volume attributable to the notch portion increases toward the shoulder main groove.

\* \* \* \* \*